United States Patent [19]
Court
[11] 3,769,448
[45] Oct. 30, 1973

[54] AUDIO ENCODING/DECODING SYSTEM FOR CATV

[75] Inventor: Patrick R. J. Court, Los Angeles, Calif.

[73] Assignee: Optical Systems Corporation, Los Angeles, Calif.

[22] Filed: Sept. 28, 1971

[21] Appl. No.: 184,474

[52] U.S. Cl. .......... 178/5.1
[51] Int. Cl. .......... H04n 1/44
[58] Field of Search .......... 178/5.1

[56] References Cited

UNITED STATES PATENTS 3,231,818 8/1972 Court .......... 178/5.1

*Primary Examiner*—Benjamin A. Borchelt
*Assistant Examiner*—S. C. Buczinski
*Attorney*—Lindenberg, Freilich & Wasserman

[57] ABSTRACT

In a Community Antenna Television (CATV) System, a system for hiding the audio portion of a television program from unauthorized television receivers connected to the CATV distribution system, is provided by converting the video carrier frequency to another frequency whereby intercarrier demodulation at a receiver, which is necessary to recover the audio program, cannot be accomplished. Provision is made at authorized receivers for restoring the video and audio carriers to their proper relative frequency locations.

10 Claims, 29 Drawing Figures

INVENTOR.
PATRICK R. J. COURT
BY Lindenberg, Freilich & Wasserman
ATTORNEYS

INVENTOR
PATRICK R.J. COURT
BY Lindenberg, Freilich & Wasserman
ATTORNEYS

INVENTOR
PATRICK R. J. COURT
BY Lindenberg, Freilich & Wasserman
ATTORNEYS

INVENTOR.
PATRICK R.J. COURT
BY Lindenberg, Freilich & Wasserman
ATTORNEYS

INVENTOR.
PATRICK R. J. COURT
BY Lindenberg, Freilich & Wasserman
ATTORNEYS

INVENTOR.
PATRICK R.J. COURT
BY Lindenberg, Freilich & Wasserman
ATTORNEYS

F (MHz) →

INVENTOR.
PATRICK R. J. COURT
BY Lindenberg, Freilich & Wasserman
ATTORNEYS

F (MHz) →

INVENTOR
PATRICK R. J. COURT
BY Lindenberg, Freilich & Wasserman
ATTORNEYS

AUDIO ENCODING/DECODING SYSTEM FOR CATV

FIELD OF THE INVENTION

This invention relates to television audio secrecy systems and more particularly to improvements therein.

With the advent of CATV, where many subscribers have their receivers connected to a coaxial cable for the purpose of receiving television programs in a better form than they would receive if they put up their own antennas, considerable thought has been given to utilization of this distribution system for purposes other than just distributing programs received from public broadcast television stations. Some thought has been given to sending special television programs originated by the CATV system operator which are of interest to only certain ones of the subscribers. These could be lectures or special conferences where it is desired to permit only certain subscribers to receive the program and not others. This, however, requires that the programs of this type be encoded, and that the selected subscribers have their receivers provided with decoders.

Numerous techniques for encoding either video or audio or both have been proposed in the past, and have been built and operated. However, one of the economic facts of life is that where the audience that is to have these decoders constitutes a large number, the cost of the decoder must be low or the capital investment becomes astronomical. While an encoding system that permits low cost decoders is desirable, one must also bear in mind that the encoding scheme to be employed should provide sufficient security so that it cannot be easily decoded.

Proposals have been made for transposing the FM audio carrier from its normal frequency position, which is 4.5 MHz above the video carrier to a non-standard position, such as 1.0 MHz below the video carrier where the audio cannot be reproduced by a standard intercarrier TV receiver and is therefore inaudible. Such proposals are very effective in the environment of television broadcasting for which they were intended. With broadcast television, FCC channel allocations preclude frequency-adjacent transmitters in the same area. In fact they are required to be separated by many miles. In CATV distribution systems however, television channels exist side by side, with no guard band whatsoever between them, and this seemingly simple solution to the problem of encoding audio proves difficult and/or expensive when it comes to decoding. The transposed audio carrier must be selected by a narrow band amplifier for the purpose of heterodyning it back to its normal IF frequency position. In most instances, it is required to encode the video along with the audio. Decoding signals are then usually amplitude modulated on the audio carrier. When the encoded channel is adjacent to a standard channel, the audio carrier for the standard channel is a meager 0.5 MHz distant from the encoded channel audio carrier. Considerable difficulty is experienced in providing enough IF selectivity in the decoder to reject this carrier completely and this gives rise to problems caused by incidental amplitude modulation of the encoded channel audio resulting from the adjacent FM carrier riding on the skirt of the selectivity curve and perturbing the desired encoding signals amplitude modulated on the encoded channel audio carrier. The problem is compounded by the inexpensive nature of many CATV modulators and other "head-end" equipmemt, in which the audio frequency stability is marginal, and in which incidental AM may be additionally present on the FM audio carrier as it is transmitted.

It is not possible to increase the spacing of the two audio carriers in such systems, without encroaching further upon the vestigial sideband information associated with the co-channel video carrier and/or experiencing disturbance of the decoding signals due to the co-channel video sidebands themselves. The 1.0 MHz separation already results in some encroachment of the normal 1.25 MHz allocated to the vestigial sideband between the video carrier and the band end of the channel.

A further consideration, in CATV systems, is that the presence of a new carrier so close to the band end of the channel can cause adjacent interference in some television receivers which are tuned to the channel immediately below the encoded channel. TV receivers are not equipped with adjacent channel IF traps tuned to the specific intermediate frequency of the new carrier and they may therefore not always possess adequate IF selectivity to reject it.

OBJECTS AND SUMMARY OF THE INVENTION

An object of this invention is to provide an audio secrecy system which is simple and relatively inexpensive to implement.

Yet another object of this invention is to provide a novel and useful audio secrecy system for use with CATV transmission systems.

Still another object of this invention is to provide an audio secrecy system which enables a clean recovery of the audio carrier and any decoding signals modulated thereon, unaffected by adjacent channe carriers.

A further object of this invention is to provide an audio secrecy system in which there is no encroachment upon the vestigial sideband information associated with the video carrier.

An additional object of this invention is to provide an audio secrecy system which does not create potential interference with adjacent channels.

These and other objects of the invention may be achieved in an arrangement wherein the audio carrier is transmitted in its normal position in the channel and the position of the video carrier is moved to the opposite side of the channel. Thus, the video channel is transmitted essentially frequency-inverted. A preferred video carrier frequency is 1.50 MHz from the upper band end instead of 1.25 from the lower band end where it is now. This corresponds to a separation from the audio carrier of 1.25 MHz. As a result of the shift of the video carrier, receivers relying on intercarrier demodulation for providing the audio are unable to decode the audio. For decoding the audio, a converter is necessary which shifts the video back to its normal position prior to feeding the program to the subscriber television receiver.

BRIEF DESCRIPTION OF THE DRAWINGS

FIGS. 1A, 1B and 1C are frequency allocation drawings. FIG. 1A indicates the disposition of standard channels as they are normally transmitted through a CATV distribution system and is shown to afford a better understanding of this invention. It will be noted that the channels are transmitted adjacently, with no guard band in between adjacent channels, and with equal amplitude.

FIGS. 1B and 1C respectively indicate an encoded channel in accordance with this invention both in the environment of adjacent standard or non-encoded channels and in the environment of adjacent channels, also encoded in accordance with this invention. The audio carrier A of the encoded channel remains in its standard normalized frequency position of 5.75 MHz, however the position of the video carrier V is moved to essentially the opposite side of the channel. The video channel and its sidebands are therefore essentially frequency-inverted. The preferred normalized frequency of the video carrier of the encoded channel is 4.5 MHz, yielding an intercarrier spacing between video and audio of 1.25 MHz. This precludes intercarrier detection of the audio information in a conventional television receiver without a decoder and the audio is thus effectively encoded. The color sub-carrier C is transmitted 3.58 MHz below the video carrier which corresponds to a normalized channel frequency of 0.92 MHz.

In FIGS. 1A, 1B and 1C the adjacent video and audio carriers, and adjacent color sub-carriers are respectively designated $V_A$, $A_A$ and $C_A$. It will be noted from FIG. 1B, wherein an encoded channel is transmitted in the environment of adjacent standard channels, that the encoded audio carrier A is 1.25 MHz distant from the encoded co-channel video V. It is also 1.5 MHz distant from the adjacent video carrier $V_A$. In FIG. 1C, which shows an encoded channel in the environment of similarly encoded channels, it will be observed that the encoded audio carrier A is still obviously 1.25 MHz from the encoded co-video V, and is also 1.17 MHz from the adjacent encoded color sub-carrier $C_A$. The energy content of $C_A$ is relatively low in comparison with $V_A$ and its lower sideband extends only 0.5 MHz (at $-3.0dB$) from the carrier. The lower sideband of $V_A$ extends 0.75 MHz at $-3.0dB$.

Thus the closest carrier to the audio carrier A of the encoded channel is the relatively low energy color sub-carrier $C_A$ of an adjacently transmitted encoded channel and this is 1.17 MHz distant from the encoded audio carrier A. The adjacent video carrier $V_A$ of an adjacent standard channel, it will be emphasized again, is 1.5 MHz distant.

Figure 1A:
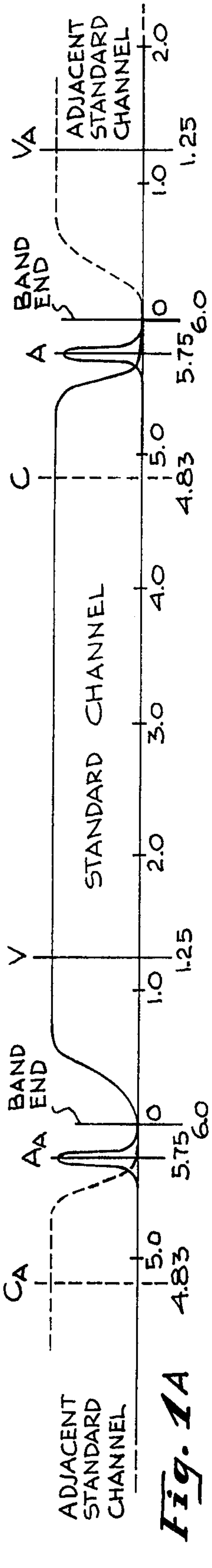
FIG. 1A illustrates a frequency-normalized standard RF channel in the environment of adjacent standard channels as distributed in a typical CATV system.
Figure 1B:
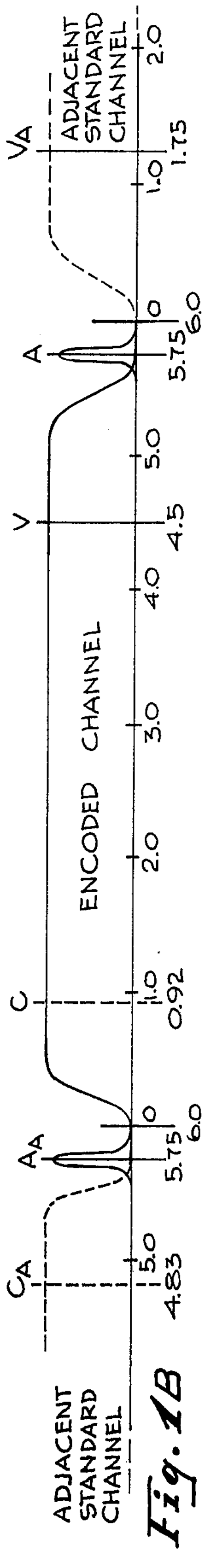
FIGS. 1B and 1C respectively illustrate a frequency-normalized RF channel, encoded in accordance with this invention, in the environment of adjacent standard channels and similarly encoded channels, as they would be distributed in a typical CATV system.
Figure 1C:
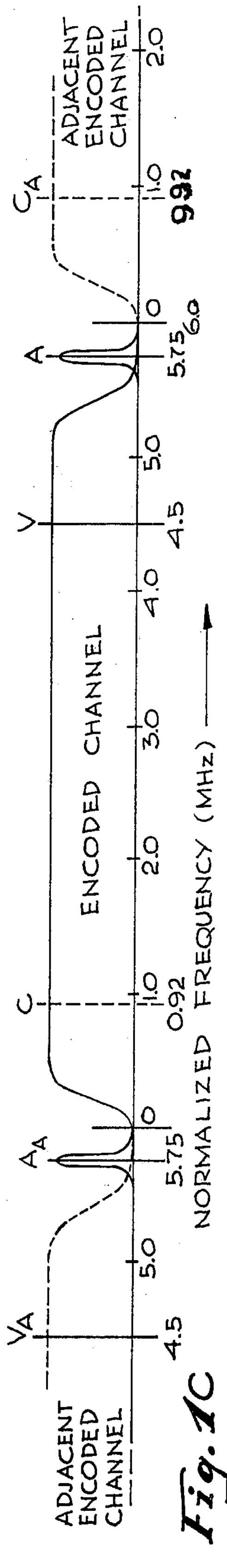

From FIG. 1B and 1C it will also be apparent that there is no erosion of the vestigial sideband of the video carrier V. The video carrier V is positioned 1.25 MHz from A, which is exactly equivalent to the spacing, in FIG. 1A,of the video carrier V from the band end of a standard channel.

It will also be noted that no new carriers are created which are proximate to the band end and which may create potential interference with adjacent channels. The energy of the encoded color subcarrier lower sideband is virtually zero at the transmitted band end, as is the energy of the vestigial sideband of the standard channel.

Figures 2A, 2B, 2C, 8A, 8B:
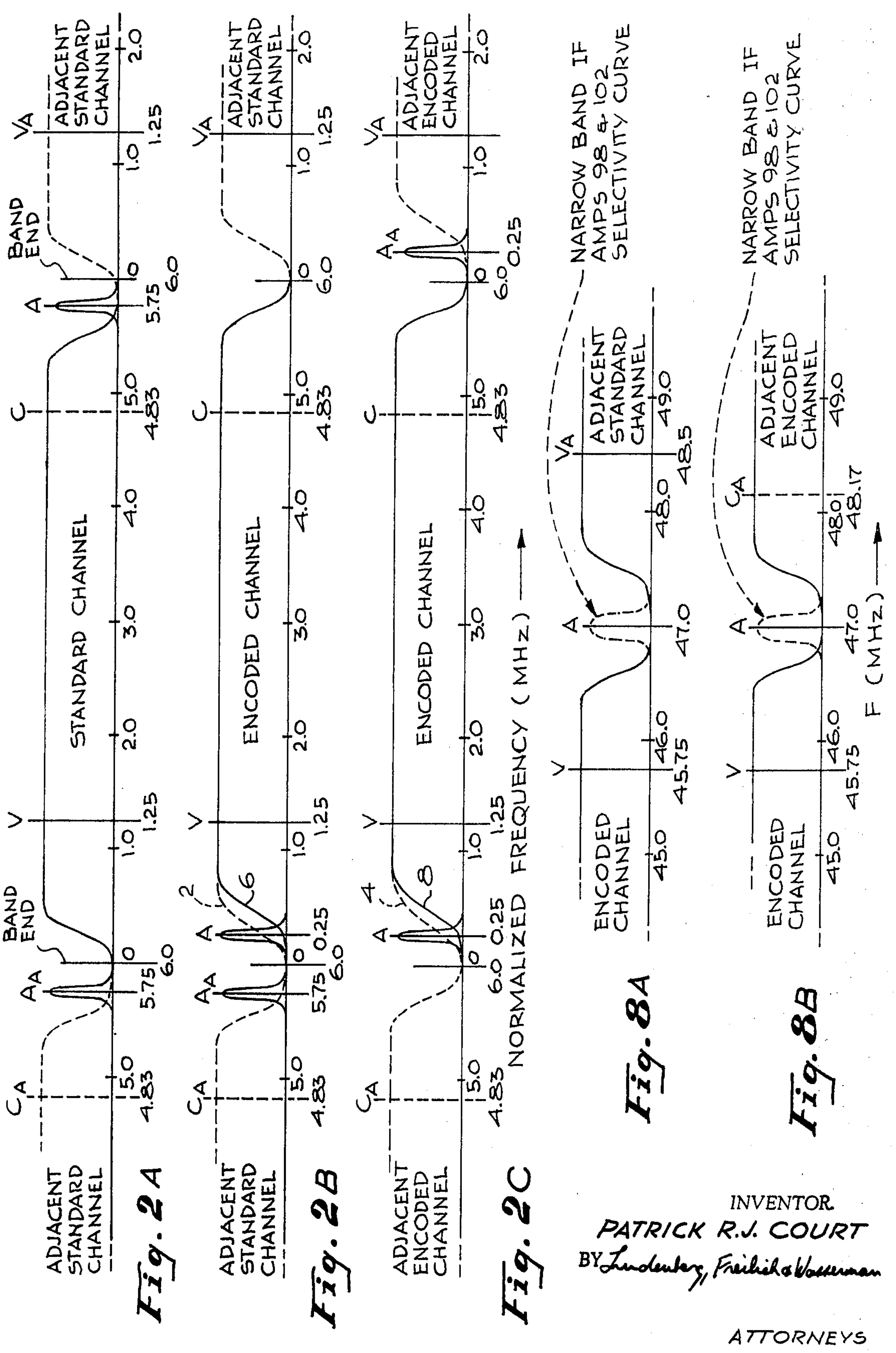
FIG. 2A illustrates a frequency-normalized standard RF channel, in the environment of adjacent standard channels as distributed in a typical CATV system.
FIGS. 2B and 2C respectively illustrate a frequency-normalized RF channel, encoded in accordance with the prior art, in the environment of adjacent standard channels and similarly encoded channels, as they would be distributed in a typical CATV system.
FIGS. 8A and 8B illustrate a decoder IF selectivity curve in the presence of adjacent standard and encoded channels.

For comparison, reference is made to FIG. 2. FIG. 2A shows again the disposition of standard channels as normally transmitted by a CATV system, with no guard band separation between channels, and with carriers of the same relative amplitude. As in FIG. 1, the nomenclature V, A and C denominates the co-channel video, audio and color carriers respectively, while $V_A$,$A_A$ and $C_A$ respectively denominate the adjacent video, audio and color sub-carriers.

FIGS. 2B and 2C both indicate an encoded channel in accordance with the prior art, in which the video carrier V remains positioned in its standard location of 1.25 MHz, and in which the audio carrier A is encoded by virtue of its non-standard location within the channel at 0.25 MHz. In FIG. 2B this type of encoded channel is shown transmitted adjacently on a CATV system with equal amplitude standard channels. In FIG. 2C it is shown transmitted adjacently with equal amplitude adjacent channels which are similarly encoded.

Three factors are evident from FIGS. 2B and 2C in contrast with the situation illustrated in FIG. 1. The first is that the relocation of the audio carrier A has resulted in an enroachment upon and consequent erosion of the video vestigial sideband in the amount of 0.25 MHz, by virtue of the 1.0 MHz separation between A and V. The dotted lines 2 and 4 in FIGS. 2B and 2C respectively show the normal envelope of the vestigial sideband while the solid lines 6 and 8 indicate the eroded sideband. The second factor, clearly shown in FIG. 2B is that the audio carrier $A_A$ of a lower adjacent standard channel is only 0.5 MHz distant from the encoded audio carrier A. FIG. 2C shows the same encoded channel transmitted adjacently with similarly encoded channels. In this case the encoded audio carrier A is 1.42 MHz from the lower adjacent color subcarrier $C_A$. As standard channels however will obviously represent the majority of those transmitted on a CATV system, it is evident that the potential interference of $A_A$ with A represents a severe problem in the decoder. It is very difficult to provide sufficient IF selectivity to prevent incidental AM, due to the adjacent audio carrier $A_A$, from disturbing the wanted audio carrier A and in particular any decoding signals modulated thereon. The third factor that will be evident from FIGS. 2B and 2C is the presence of the new carrier A only 0.25 MHz from the lower band end of the encoded channel. This represents a potential interference with the lower adjacent channel, due to inadequate IF selectivity in some television receivers tuned to that channel.

The audio encoding system which is the subject of the present invention thus achieves very significant improvements, in a CATV environment, in the important aspect of eliminating interference from adjacent channels. It also achieves improvements in the elimination of co-channel vestigial sideband erosion and improvement in the potential interference with the decoding signals from the co-channel vestigial sideband components. It further achieves improvements in a CATV environment, with respect to potential interference from the encoded channel into the adjacent channels themselves.

Figure 3:
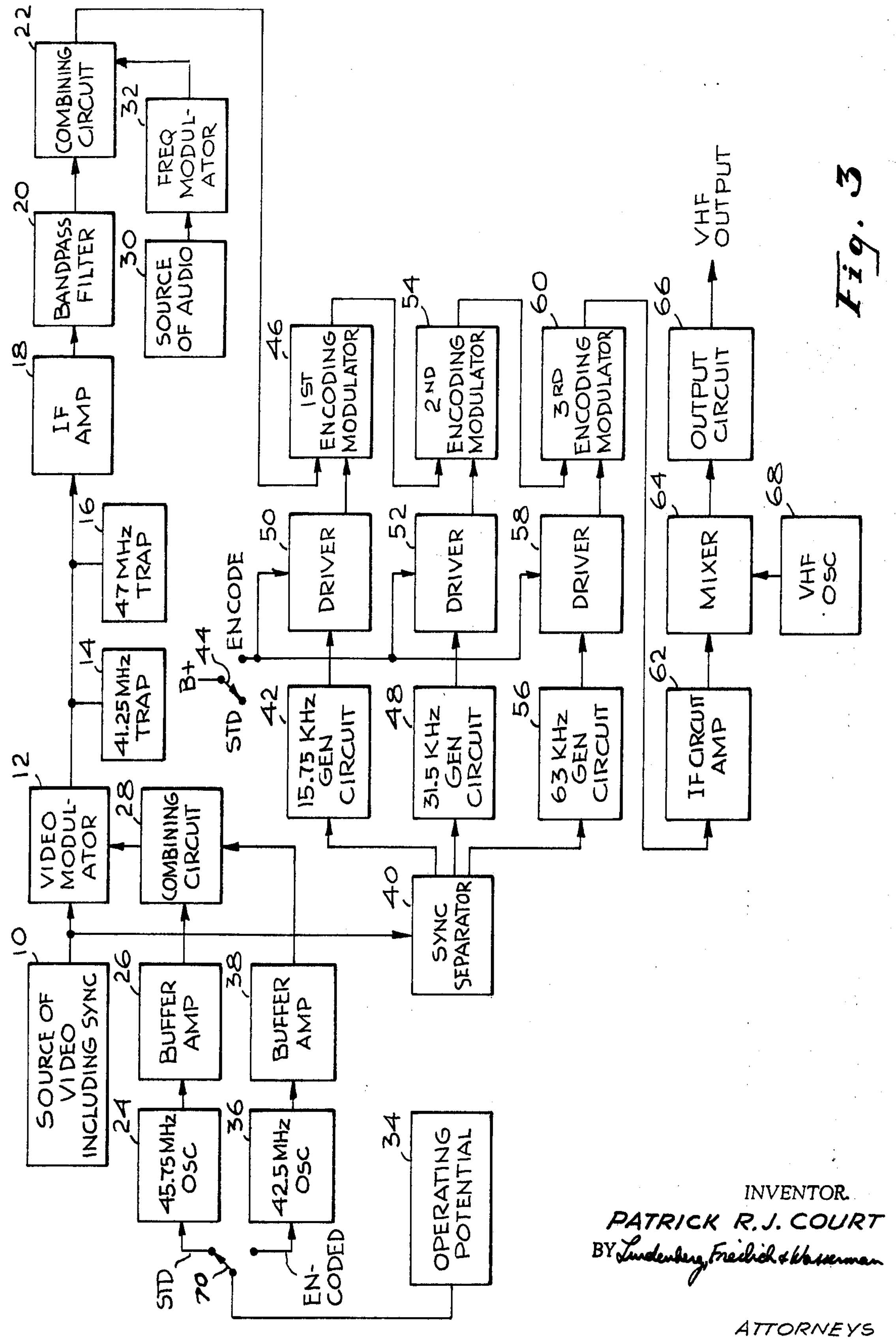
FIG. 3 is a block schematic diagram of an encoder in accordance with this invention.

Reference is now made to FIG. 3 which is a block diagram illustrating audio encoding in accordance with this invention. In order to present a complete picture, the block schematic diagram also illustrates video encoding of the type described and claimed in a co-pending patent application entitled "Encoding and Decoding System for CATV," Ser. No. 113,393, filed Feb. 8, 1971, now U.S. Pat. No. 3,729,576, by this inventor and assigned to a common assignee. In the co-pending application there is described a system wherein a video carrier modulated with video is encoded by amplitude modulating the video carrier with sinusoidal and cosinusoidal waveforms. Decoding is achieved by remodulating the encoded video carrier with a decoding sine wave and cosine wave in antiphase with the encoding since wave and cosine wave, thereafter modulating the result, to eliminate residual error, with another cosine function wave applied in phase opposition to the resultant error component. The correction cosine function wave has twice the frequency of the basic encoding sine wave and is preferably applied at the encoder rather than the decoder. The audio carrier at the transmitter is also amplitude modulated with the encoding sine wave, as well as the two cosine waves. These are separated in the decoder and used to generate an antiphase decoding sine wave and antiphase decoding cosine wave.

A source of video signals 10 which include the sync signals, is applied to a video modulator 12. Also applied to the video modulator is either an intermediate carrier frequency of 45.75 MHz, or an intermediate carrier frequency of 42.5 MHz. These intermediate carrier frequencies are derived, for the case of the 45.75 MHz, from an oscillator 24, and for the case of the 42.5 MHz from an oscillator 36. The one of these which is to be allowed to operate is determined by connecting a source of operating potential 34 to a selecting switch 70. The selecting switch applies operating potential to the one of the two oscillators for standard or encoded transmissions as desired.

The output of the 45.75 MHz oscillator is applied to a buffer amplifier 26. The output of the 42.5 MHz oscillator is applied to a buffer amplifier 38. The two outputs of the buffer amplifiers are applied to a combining circuit 28 which actually does not combine these two outputs but rather channels one or the other to the video modulator 12.

The output of the video modulator is thus a 45.75 MHz IF video carrier in the standard or non-encoded mode of operation or a 42.5 MHz IF video carrier in the non-standard or encoded mode of operation. 45.75 MHz corresponds to the industry accepted standard video IF which has been chosen for convenience. Other intermediate frequencies could of course also be used.

The output of the video modulator 12 is applied by a line to an IF amplifier 18. A 41.25 MHz trap, 14, and a 47.0 MHz trap, 16, are also connected to this line. The output of the IF amplifier 10 is applied through a bandpass filter 20, to a combining circuit 22. The combining circuit adds to the video IF, audio at the normal IF frequency of 41.25 MHz, derived from a conventional frequency modulator circuit 32 operating at that carrier frequency.

Accordingly, as shown by the two frequency allocation diagrams respectively 4A and 4B, the output of the combining circuit when the standard video IF is selected will be audio at 41.25 MHz and video at 45.75 MHz. WHen the encoded IF is selected the audio output is also 41.25 MHz and the video output is 42.5 MHz.

In the standard mode the video/audio inter-carrier spacing is the conventional 4.5 MHz. In the encoded mode the video/audio intercarrier spacing is only 1.25 MHz.

Figures 4A, 4B:
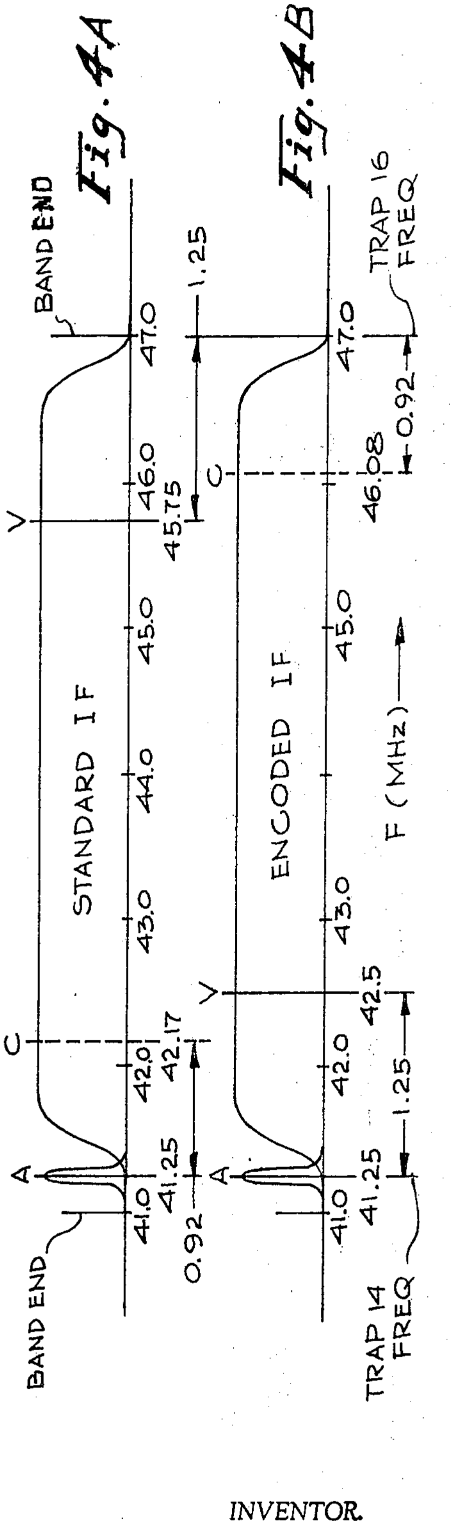
FIGS. 4A and 4B respectively illustrate standard and encoded IF channels as used in the encoder of FIG. 3.

The bandpass filter 20 and the two traps 14 and 16 in FIG. 3 serve to provide precise band-shaping of the IF channel in both the standard and encoded modes of transmission. As shown in FIG. 4 trap 14, tuned to 41.25 MHz, eliminates any components in the video vestigial sideband, which can perturb the audio carrier A when the transmitted mode is encoded. It also eliminates any components in the color sidebands which can similarly perturb the audio carrier A when the transmitted mode is standard. Trap 16 provides precise band-end attenuation of the video and color sidebands in the standard and encoded modes respectively.

The foregoing description shows how the audio is encoded by shifting the video frequency. The description that follows illustrates how the video is encoded by modulating the video at IF, together with the audio, with sine and cosine waves in accordance with the previously mentioned co-pending application.

In FIG. 3, a sync separator 40 has applied to its input the output of the source of video 10. The sync separator separates the horizontal and vertical sync from its input and applies the horizontal sync to a 15.75 KHz generator circuit 42, a 31.5 KHz generator circuit 48, and a 63.0 KHz generator circuit 56. Since the horizontal sync occurs at 15.75 KHz, the 31.5 KHz generator circuits and 63.0 KHz generator circuit may be frequency doubler and quadrupler circuits. The outputs of the generator circuits 42, 48 and 56 are each applied to respective driver circuits 50, 52, and 58. For standard transmissions, a switch 44 withholds B+ from the driver circuits. For encoded operation the switch 44 is positioned at the location at which it will apply B+ to the drivers, thus enabling them.

The drivers, 50, 52 and 58 respectively apply 15.75 KHz, 31.5 KHz and 63.0 KHz to first, second and third encoding modulators 46, 54 and 60. The first encoding modulator modulates 15.75 KHz on the intermediate frequency video and audio carrier outputs of the combining circuit. The output of the first encoding modulator is applied to the second encoding modulator 54, to have the 31.5 KHz sine wave modulated thereon. The output of the second encoding modulator is applied to the third encoding modulator 60, to have the 63.0 KHz sine wave modulated thereon. The output of the third encoding modulator 60 is applied to an IF amplifier circuit 62. Its output is applied to a mixer 64. This mixer up-converts the IF channel to an appropriate VHF channel frequency. To do this the output of a high-side VHF oscillator 68 is applied thereto. The frequency of the oscillator 68 remains the same for both the encoded and non-encoded modes. As an example, if it is desired to transmit VHF channel 3 (60.0 to 66.0 MHz, band end to band end), the frequency of oscillator 68 will be 107.0 MHz. The video carrier output of mixer 64, in the standard mode, will then be 107.0 minus 45.75 MHz which is 61.25 MHz. In the encoded mode it will be 107.0 minus 42.5 MHz which is 64.5 MHz. The audio carrier output frequency, in both modes, will be 107.0 minus 41.25 MHz which is 65.75MHz. The output of mixer 64 is applied to an output amplifier circuit 66, which increases the amplitude of the carriers to a level suitable for combining with the other channel generators forming the CATV head-end system, prior to insertion into the cable distribution system.

Figure 5:
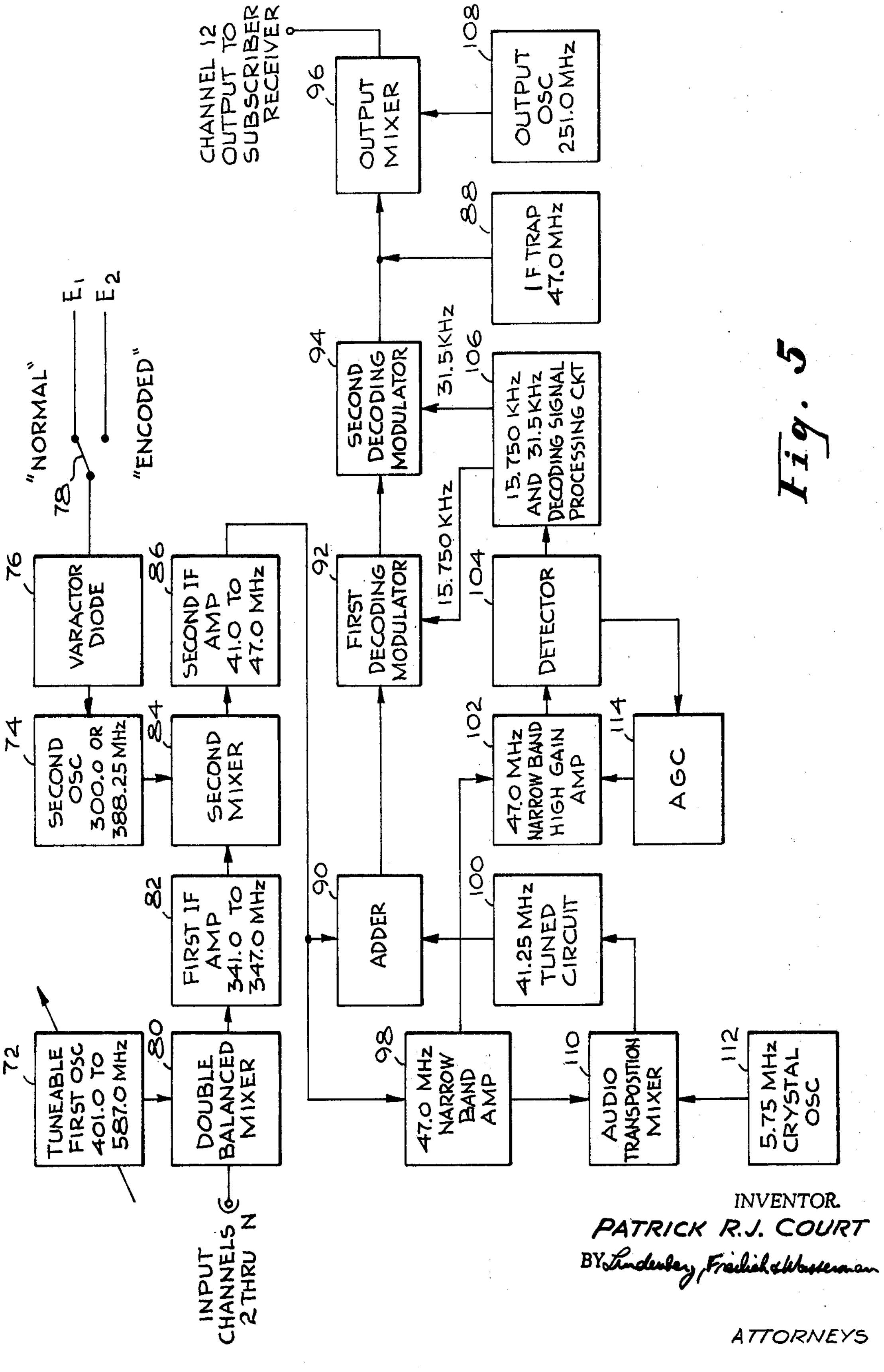
FIG. 5 is a block schematic diagram of a decoder in accordance with this invention.

FIG. 5 is a block schematic diagram of a converter-decoder to receive and convert standard television channels and also to receive, decode and convert television channels which have been encoded in accordance with this invention. On the assumption that there are a plurality of channels, both standard and encoded as has been shown in FIG. 1, these are applied to a double balanced mixer 80, and converted to a first IF by means of a tuneable first oscillator 72. By way of illustration, the first IF covers the band 341.0 to 347.0 MHz which is the bandwidth required by one channel. THe tuneable first oscillator 72 provides a frequency which can be varied between 401.0 and 587.0 MHz to provide for the selection of up to 26 CATV channels. The input to mixer 80 is of course broadband to the CATv channels and the selectivity of the IF, in conjunction with the first oscillator frequency, determines the channel to be converted. As an example, when the first oscillator is at a frequency of 407.0 MHz, channel 3 (which covers the band from 60.0 to 66.0 MHz) which will be converted to 407.0 minus 60.0 to 66.0 MHz which is 341.0 to 347.0 MHz. This IF channel will be selected and amplified by the first IF amplifier 82. As the first oscillator 72 is a "high side" oscillator, the first IF channel will be frequency inverted with respect to the input channel.

A second mixer 84 receives the output of the first IF amplifier and also the output of a second oscillator 74. The second oscillator has two possible modes of operation. One of these is a low side mode for converting standard first IF signals to a second IF channel. The other is a high side mode for converting encoded first IF signals to the second IF channel. For convenience, but without limitation, the second IF has been chosen as the commonly accepted industry standard television IF extending from 41.0 to 47.0 MHz.

In the low side mode the frequency of the second oscillator is 300.0 MHz and in the high side mode its frequency is 388.25 MHz. The one of these frequencies which is provided is determined by a varactor diode 76. This is a commercially sold diode whose output capacitance can be varied by the voltage applied thereacross, and therefore can be used to alter the frequency of an oscillator, in a well known manner. The capacitance of the varactor is determined by the operation of a switch 78 to either a "normal" or "encoded" channel position.

The second IF output of mixer 84 is selected and amplified by a second IF amplifier 86.

Figure 7A:
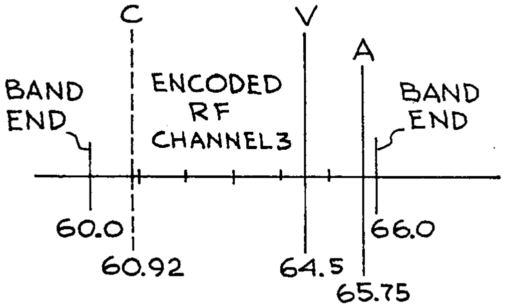
FIGS. 7A, 7B, 7C and 7D are frequency distribution diagrams illustrating the RF and IF processing of an encoded television channel when received by the decoder shown in FIG. 5.
Figure 6A:
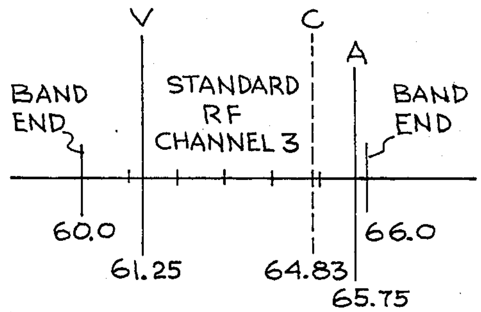
FIGS. 6A, 6B and 6C are frequency distribution diagrams illustrating the RF and IF processing of a standard or non-encoded television channel when received by the decoder shown in FIG. 5.
Figure 7B:
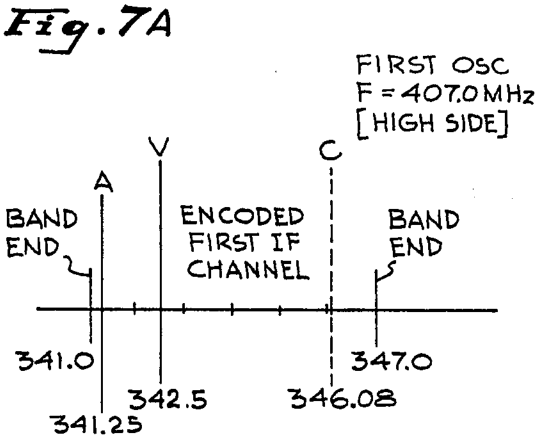
Figure 6B:
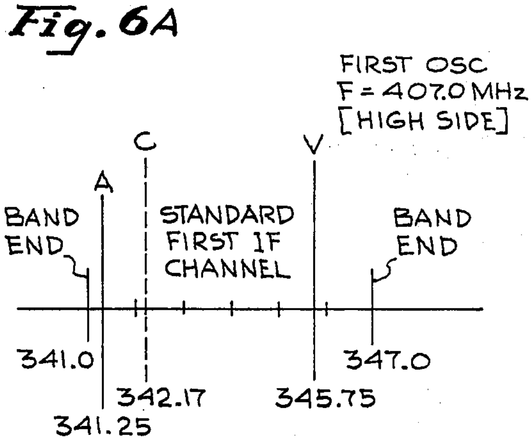
Figure 7C:
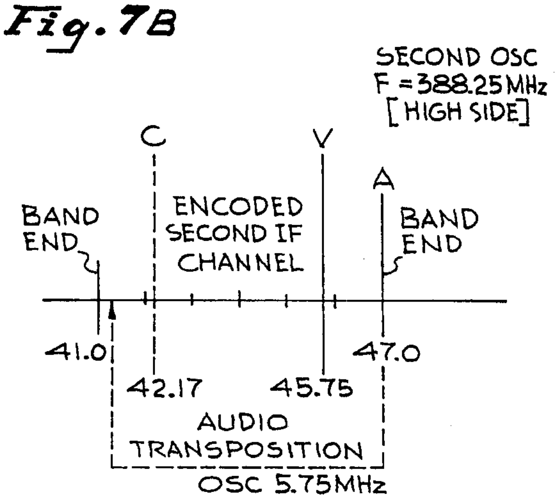
Figure 6C:
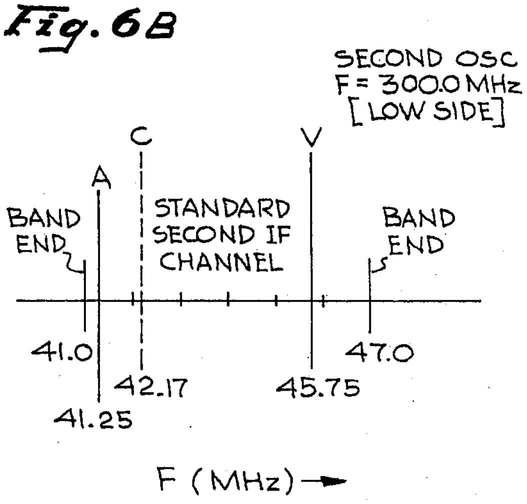

In order that these conversion processes can be more clearly understood, attention is now drawn to FIG. 6A, 6B and 6C which illustrate the conversion sequence for a standard channel. Corresponding FIGS. 7A, 7B and 7C illustrate the conversion sequence for an encoded channel.

FIG. 6A shows the band end and carrier locations of standard RF channel 3, as received from the cable system. The band ends are at 60.0 and 66.0 MHz, the video carrier V at 61.25 MHz, the color sub-carrier C at 64.83 MHz and the audio carrier at 65.75 MHz.

FIG. 6B shows the disposition of the carriers in the first IF channel after conversion with a first oscillator frequency of 407.0 MHz. The first IF is frequency inverted because of the first oscillator being high side. Consequently the video carrier V is at 407.0 minus 61.25 MHz which is 345.75 MHz. The audio carrier A is similarly converted to 341.25 MHz and the color subcarrier is located at 342.17 MHz. The first IF channel band ends are at 341.0 and 347.0 MHz.

FIG. 6C illustrates the disposition of the carriers within the second IF channel after conversion with a second oscillator frequency of 300.0 MHz, in the low side mode of operation. The video carrier V is converted to 345.75 minus 300.0 MHz which is 45.75 MHz. The audio carrier A is similarly converted to 41.25 MHz and the color subcarrier C to 42.17 MHz. The second IF channel band ends are at 41.0 and 47.0 MHz. There is thus no inversion of the channel during the second conversion process and the carrier locations shown those for the standard television IF band.

FIG. 7A shows the band end and carrier locations of RF channel 3, transmitted in the encoded mode. The band end and audio carrier locations are as previously shown in FIG. 6A, but the video carrier V is transmitted at 64.5 MHz instead of 61.25 MHz. The video channel is essentially inverted with respect to the audio carrier and the new location of the color sub-carrier C is at 60.92 MHz.

FIG. 7B depicts the encoded channel first IF carrier and band end locations after conversion with the first oscillator frequency of 407.0 MHz. As before, the first IF channel is frequency inverted with respect to the RF channel and the video carrier V falls at 407.0 minus 64.50 MHz which is 342.5 MHz, while the color subcarrier C falls at 346.08 MHz. As is the case with the standard transmission, the audio carrier is at 341.25 MHz, which is the same location it occupies in corresponding FIG. 6B.

FIG. 7C shows the band end and carrier locations of an encoded channel in the second IF after a second conversion with a high side second oscillator frequency of 388.25 MHz. It will be recalled, with brief reference to FIG. 5, that when an encoded transmission is being received, switch 78 is set to the "encoded" position and second oscillator 74 is thereby caused to operate in a high side mode. This second conversion results in a complete frequency inversion of the second IF channel with respect to the first IF channel and the video carrier frequency V becomes 388.25 minus 342.5 MHz which is 45.75 MHz. The color subcarrier C becomes 388.25 minus 346.08 MHz which is 42.17 MHz and the audio carrier A becomes 388.25 minus 341.25 MHz which is 47.0 MHz. This happens to coincide with the band end.

In comparison with FIG. 6C, it will be noted that the encoded second IF video and color carriers V and C respectively are now correctly positioned at the standard IF frequencies, however the encoded audio carrier A is not. It is positioned at 47.0 MHz instead of its desired location at 41.25 MHz.

The subsequent processing and/or decoding of both the standard second IF channel shown in FIG. 6C and the encoded second IF channel shown in FIG. 7C will now be described with further reference to the block diagram of FIG. 5. The output of the second IF amplifier 86 is applied both to an adder circuit 90 and a 47.0 MHz narrow-band IF amplifier 98. In the event that an encoded transmission is being received the audio carrier output of IF amplifier 86 will be at 47.0 MHz. This is selected and amplified by the narrow band amplifier 98 and applied both to a high gain narrow band IF amplifier 102 and to an audio transposition mixer 110. To this mixer is also applied the 5.75 MHz output from a crystal oscillator 112, to convert or transpose the 47.0 MHz audio carrier to 41.25 MHz. This frequency is selected by a tuned circuit 100, from the output of the audio transposition mixer. The 41.25 MHz tuned circuit applies its output to the adder 90, where it is added back into the second IF. The audio transposition process is indicated by the dotted arrow in FIG. 7C.

Figure 7D:
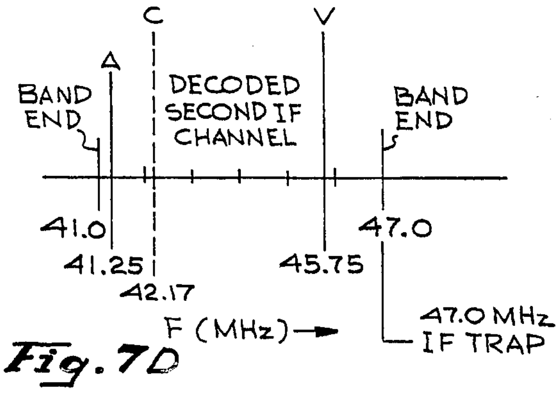

In the encoded mode, the second IF output of adder 90 thus includes two audio carriers, one at the correct transposed frequency of 41.25 MHz, and the other at the original encoded frequency of 47.0 MHz. The output of adder 90 is passed to a first decoding modulator 92 and a second decoding modulator 94. The output of the second decoding modulator is applied to an output mixer 96. Associated with the output of the second decoding modulator is a 47.0 MHz trap 88 which effectively removes the unwanted 47.0 MHz audio carrier. The second IF input to the output mixer, from a frequency viewpoint, is therefore as depicted in FIG. 7D which shows a standard IF channel, with all carriers correctly positioned and no unwanted carriers present. It should be directly compared with FIG. 6C.

Video decoding is in accordance with the system described in the aforementioned copending application, Ser. No. 113,393 and will now be briefly described for clarity, with reference to FIG. 5.

In the presence of an encoded IF channel, the 47.0 MHz audio carrier is further amplified by a high gain narrow band IF amplifier 102. Its output is applied to a detecting circuit 104 which detects the presence of the 15.750 and 31.5 KHz decoding sine and cosine signals. An AGC circuit 114 to which some of the output of the detector 104 is applied is used to control the gain of the high gain narrow band IF circuit 102. The output of the detector 104 is applied to a decoding signal processing circuit 106 which serves the function of selecting and controlling the phases and amplitudes of the 15.75 KHz sine and 31.5 KHz cosine wave signals. The 15.750 KHz sine wave is applied to the first decoding modulator 92 and the 31.5 KHz cosine wave is applied to the second decoding modulator 94. Thereby, as described in the above-indicated application, the encoded video is decoded. The encoding signal modulation of both the video and audio second IF carriers is cancelled and the input to the output mixer 96 comprises a standard IF channel.

When the circuit arrangement shown in FIG. 5 receives a standard or non-encoded TV channel, then there is no 47.0 MHz IF audio carrier and therefore no input to either the audio transposition mixer 110 or to the 47.0 MHz narrow band amplifier 98. Consequently there is no output from the 41.25 MHz circuit 100 or from the decoding signal processor 106. The output from the second IF amplifier 86 is applied to the output mixer 96 without modification by the intervening adder 90 or the decoding modulators 92 and 94.

For both encoded and standard transmissions, therefore, the input to output mixer 96 comprises the standard IF video carrier at 47.75 MHz and the standard IF audio carrier at 41.25 MHz. The output mixer serves to convert its IF input to a suitable standard output channel, for example channel 12, which requires a second input from output oscillator 108 at 251.0 MHz. As oscillator 108 is high side, the output channel will be frequency-inverted with respect to its input, and the video carrier output from mixer 96 will be correctly positioned at 251.0 minus 45.75 MHz which is 205.25 MHz. The audio carrier will likewise be correctly positioned at 251.0 minus 41.25 MHz which is 209.75 MHz.

FIGS. 8A and 8B respectively show the disposition of both co-channel and adjacent channel carriers at the second IF frequency, both in the environment of standard channels and encoded channels respectively. It will be seen from FIG. 8A that when the encoded transmission is in the environment of an adjacent standard channel, the IF audio carrier A at 47 MHz is respectively 1.25 MHz from its own co-video V and 1.50 MHz from the adjacent video carrier V. It is apparent that this audio carrier can readily be selectively amplified by the narrow band amplifiers 98 and 102 in FIG. 5. Shown dotted is a typical selectivity curve for these amplifiers which rejects any potential interference either from V or $V_A$. Similarly from FIG. 8B it is apparent that there will be no interference from the adjacent color subcarrier $C_A$ at 48.17 MHz, when the adjacent channel is an encoded channel.

Thus it is clear that the above described audio-encoding system enables clean recovery of the audio carrier in a decoder as well as any decoding signals which may be modulated thereon.

Figure 9:
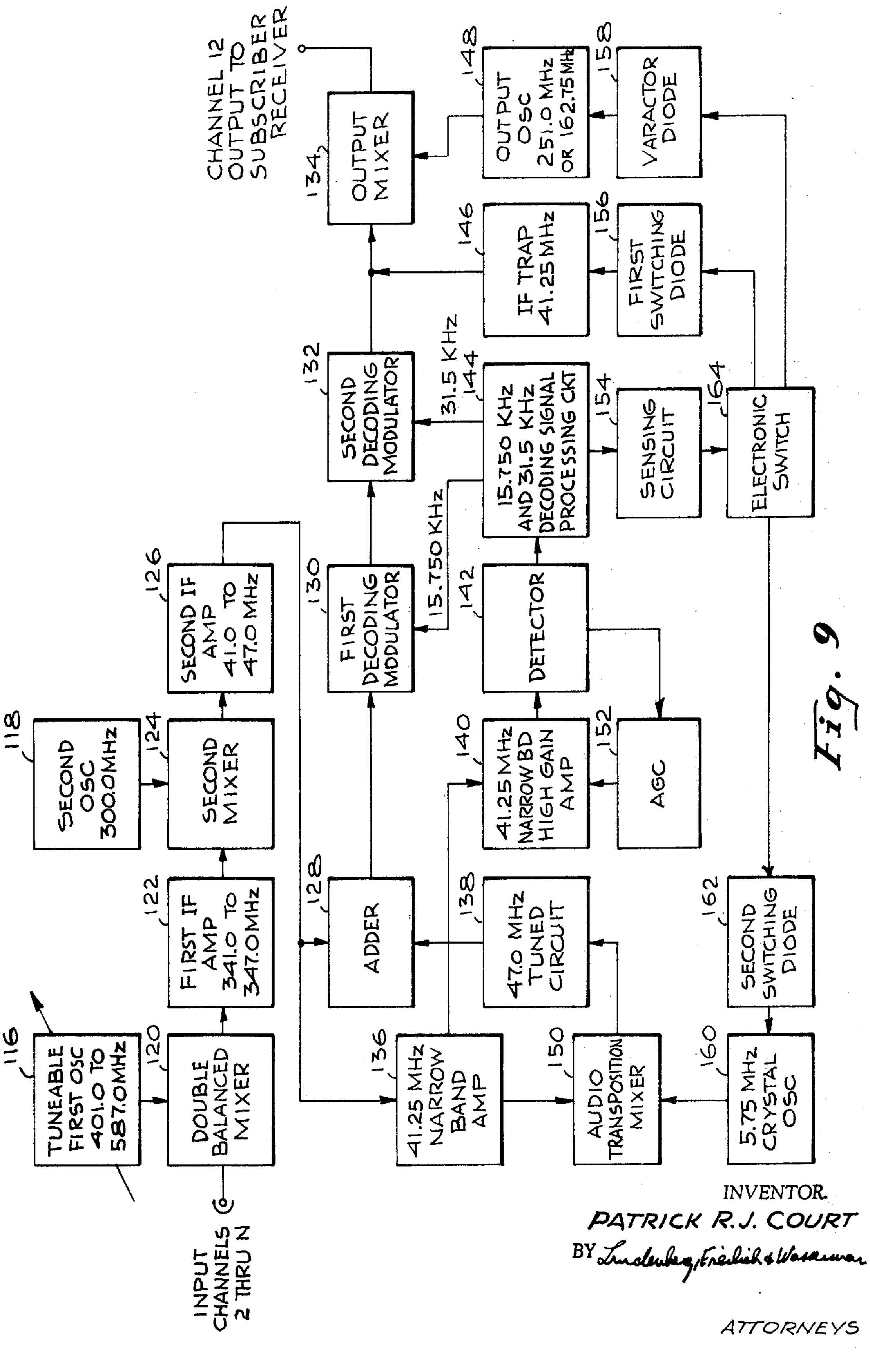
FIG. 9 is a block schematic diagram of an alternative decoder in accordance with this invention.

The block diagram in FIG. 9 depicts a converter/decoder which employs a modified conversion schedule as compared with that of the block diagram illustrated in FIG. 5. The essential difference between the two arrangements is that the output oscillator has two operating modes, rather than the second oscillator. Among the benefits that flow from this alternative arrangement is that the existence of an encoded or standard channel may be more readily sensed automatically and so the switching of oscillator modes may be accomplished automatically, rather than manually.

FIG. 9, the input television channels are converted to a first IF channel through the agency of a double balanced mixer 120 and a tuneable first oscillator 116 operating in a high side mode. The first IF signals are selected and amplified by a first IF amplifier 122 with a passband from 341.0 to 347.0 MHz. In this regard the functions of circuits represented by boxes 116, 120 and 122 in FIG. 9 are identical to the functions of the corresponding circuits represented by boxes 72, 80 and 82 in FIG. 5. The first IF channel which is frequency inverted with respect to the input IF channel, is applied to a second mixer 124 which also has a 300.0 MHz input from a second oscillator 118. It will be recognized that this oscillator is operating in a low side mode and the second IF output from mixer 124 is therefore noninverted frequency-wise with respect to the second IF input. The output from the second mixer is selected and amplified by a second IF amplifier 126, with a bandwidth 41.0 to 47.0 MHz, and is applied to an adder 128 and to a 41.25 MHz, narrow band amplifier 136. The adder represents a broadband (41–47 MHz) path to the second IF channel and its output is connected to an output mixer 134 through a first decoding modulator 130 and a second decoding modulator 132. Connected to the output of the second decoding modulator is a 41.25 MHz trap, 146, which can be enabled or disabled by means of a first switching diode 156. The output mixer 134 converts its second IF input to a suitable standard RF channel, such as channel 12 for example, for use by the subscriber's television receiver. The output mixer can operate either in a high side (frequency inverting) mode or a low side (non frequency inverting) mode, depending upon which of two possible frequencies are delivered to it from an output oscillator 148. These frequencies are respectively 251.0 MHz and 162.75 MHz and they are determined by the varactor diode 158 which acts as a variable capacitance to the oscillator circuit.

The 41.25 MHz narrow band amplifier 136 provides an output both to an audio transposition mixer 150 and to a 41.25 MHz narrow-band, high-gain amplifier 140. The audio transposition mixer receives a second input from a 5.75 MHz crystal oscillator 160, when this oscillator is enabled by a second switching diode 162.

The 41.25 MHz high gain amplifier 140 drives a detector 142 which serves both to drive the AGC circuit 152, thus maintaining constant output from the amplifier 140, and to drive the decoding signal processing circuit 144. This circuit provides inputs to the first and second decoding modulators 130 and 132 and also to a sensing circuit 154. The sensing circuit can actuate an electronic switch 164 which in turn controls the functions of the varactor diode 158 and the two switching diodes 156 and 162.

For a more detailed understanding of the conversion processes and other functions performed by the circuits in FIG. 9, reference is now made to FIG. 10 and 11 which respectively illustrate these processes for both standard and encoded channel reception. Reference will also be made to FIG. 9 as the explanation progresses.

Figure 10A:
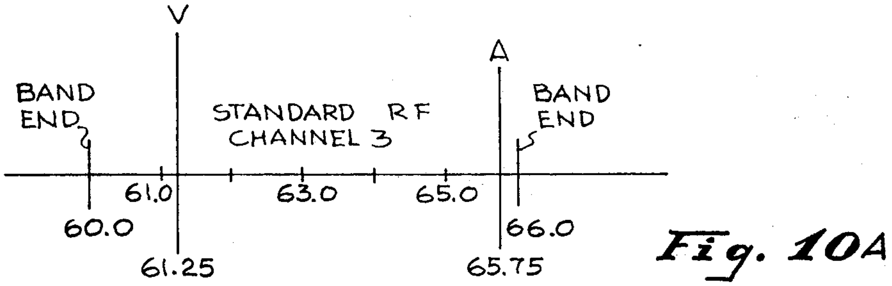
FIGS. 10A, 10B, 10C and 10D are frequency distribution diagrams illustrating the RF, IF and output channel processing of a standard or non-encoded television channel when received by the decoder shown in FIG. 9.
Figure 10B:
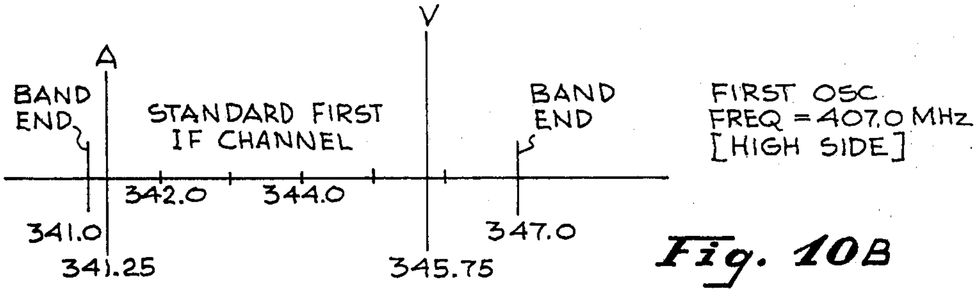
Figure 10C:
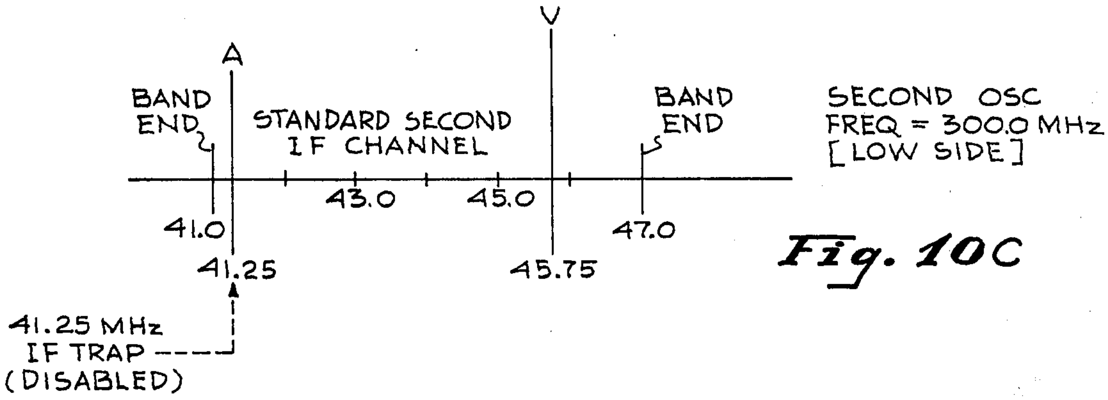

FIG. 10A represents the video and audio carrier locations of standard input channel 3 which has been chosen for illustration. The video carrier V is at 61.25 MHz and the audio carrier A is at 65.75 MHz. FIG. 10B shows the disposition of these carriers after conversion by a first, high side oscillator frequency of 407.0 MHz to the first IF channel. The first IF video and audio frequencies are respectively 345.75 and 341.25 MHz and the IF channel is thus frequency inverted with respect to the input RF channel. FIG. 10C depicts the second IF video and audio carriers created by the second mixer 124 in conjunction with the 300.0 MHz second oscillator 118 in FIG. 9. The second oscillator is low side and the second IF frequencies are obtained from 345.75 minus 300.0 MHz which is 45.75 MHz for the second IF video carrier and 341.25 minus 300.0 MHz which is 41.25 MHz for the second IF audio carrier. These two carriers are present at the input to the adder 128 and the 41.25 MHz narrow band amplifier 136 in FIG. 9. With a standard transmission, there are no decoding signals modulated upon the audio carrier and so there are no detected outputs at 15.750 KHz and 31.5 KHz to actuate the decoding signal processor 144. There are thus no inputs to the decoding modulators 130 and 132 from circuits 144 and the sensing circuit 154 is also inoperative. Sensing circuit 154 responds to the presence of either a 15.750 or 31.50 KHz signal. With the sensing circuit inoperative, the electronic switch causes the first switching diode 156 to disable the 41.25 IF trap 146. It also causes the second switching diode 162 to disable the 5.75 MHz oscillator 160 so that there is no conversion in the transposition mixer 150 of its 41.25 MHz input to a 47.0 MHz output. Finally the electronic switch 164 provides a voltage to the varactor diode 158 such that its capacitance tunes the output oscillator circuit 148 to operate at a frequency of 251.0 MHz. The output mixer 134 consequently operates in a high side mode.

With no 47.0 MHz output from the audio transposition mixer 150, the 47.0 MHz tuned circuit 138 does not add any signal to the second IF video and audio carriers passing through the adder circuit 128. Furthermore, the first and second decoding modulators 130 and 132 have no 15.750 KHz or 31.5 KHz inputs, so the second IF video and audio carriers also pass through these modulators unmodified in any way. As the 41.25 MHz trap 146 is also disabled, there is no attenuation at that frequency and the input to the output mixer 134 therefore comprises the 41.25 MHz audio carrier and 45.75 MHz video carrier as depicted in FIG. 10C. These are the same carriers which appeared at the output of the second IF amplifier 126 in FIG. 9.

Figure 10D:
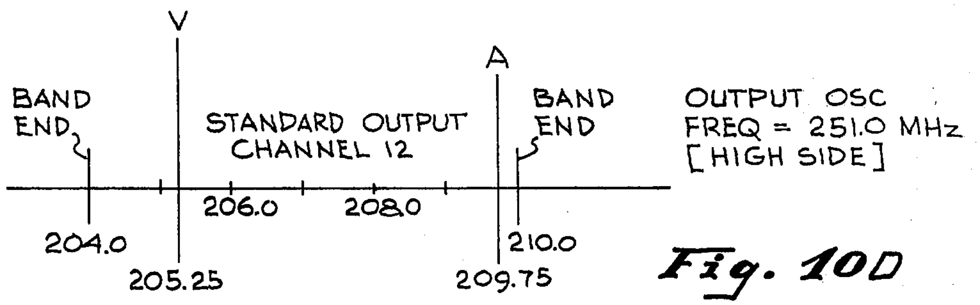

The conversion process in the output mixer 134, with the output oscillator frequency at 251.0 MHz is as follows: The output video carrier becomes 251.0 minus 45.75 MHz which is 205.25 MHz. The output audio carrier becomes 251.0 minus 41.25 MHz which is 209.75 MHz. These of course are the correct frequencies for standard channel 12 which is delivered to the subscriber's receiver. These carrier frequencies are depicted in FIG. 10D.

The converter decoder as shown in FIG. 9 therefore converts standard input channels to a standard channel 12 output, without modification.

Figure 11A:
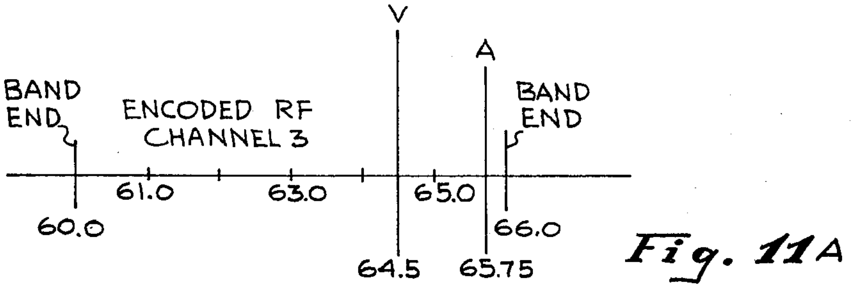
FIGS. 11A, 11B, 11C, 11D and 11E are frequency distribution diagrams illustrating the RF, IF and output channel processing of an encoded television channel when received by the decoder shown in FIG. 9.

FIG. 11A shows the video and audio carrier locations in a received input channel 3, when channel 3 is encoded in accordance with this invention. Specifically the audio is encoded by virtue of the essential frequency inversion of the video channel so that the video carrier V has a frequency of 64.5 MHz instead of its non-encoded frequency of 61.25 MHz. The encoded audio carrier A remains at its proper frequency of 65.75 MHz.

Figure 11B:
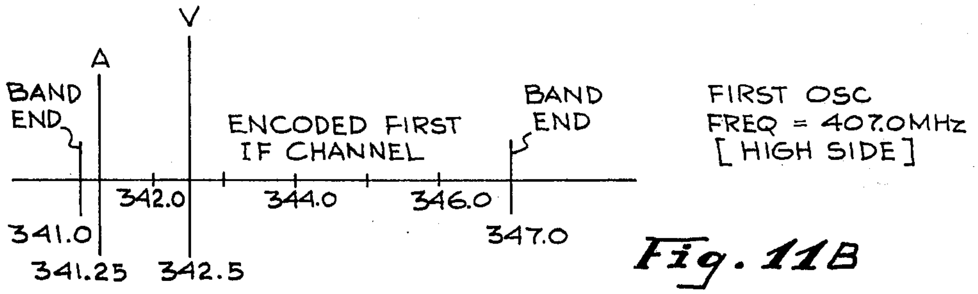

It is also assumed that video encoding is in accordance with the previously discussed copending application, and results from amplitude modulation of the video carrier with 15.750 and 31.5 KHz sine and cosine waves. These same sine and cosine waves are simultaneously amplitude modulated upon the audio carrier for purposes of providing decoding signals in the decoder. FIG. 11B depicts the encoded first IF channel which appears at the output of the first IF amplifier 122 following the application of a first oscillator frequency of 407.0 MHz to the double-balanced mixer 120 in FIG. 9. The audio carrier A occupies its proper first IF position at 341.25 MHz and the video carrier V is in its encoded position at 342.5 MHz.

Figure 11C:
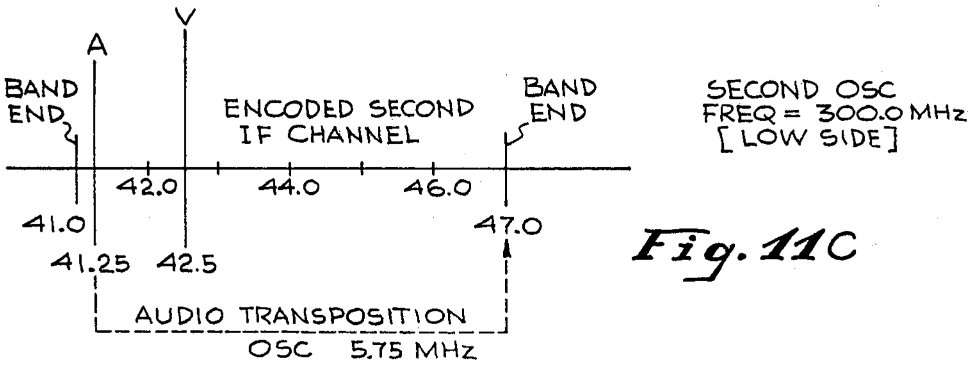

Following the second conversion with the second oscillator frequency of 300.0 MHz, the audio carrier A is positioned at 41.25 MHz and the video carrier V is positioned at 42.5 MHz, as illustrated in FIG. 11C. This is the output of the second IF amplifier 126 in FIG. 9 and these carriers are applied to both the 41.25 MHz narrow band amplifier 136 and the adder 128. The 41.25 MHz amplifier accepts the second IF audio carrier and passes it both to the 41.25 MHz narrow band high-gain amplifier 140 and to the audio transposition mixer 150. The 15.750 and 31.50 KHz amplitude modulations on the audio carrier are detected and processed in the circuits represented by the boxes 142 and 144 respectively and a 15.750 KHz input is provided to the first decoding modulator 130 and a 31.5 KHz input it provided to the second decoding modulator 132. The sensing circuit 154 senses the presence of the 15.750 KHz modulation and operates the electronic switch 164 so that it disables both the first and second switching diodes 156 and 162. It also provides a voltage to varactor 158 such that it adjusts the frequency of the output oscillator 148 to 162.75 MHz. In consequence the output mixer 134 operates in a low side mode.

Figures 11D, 11E:
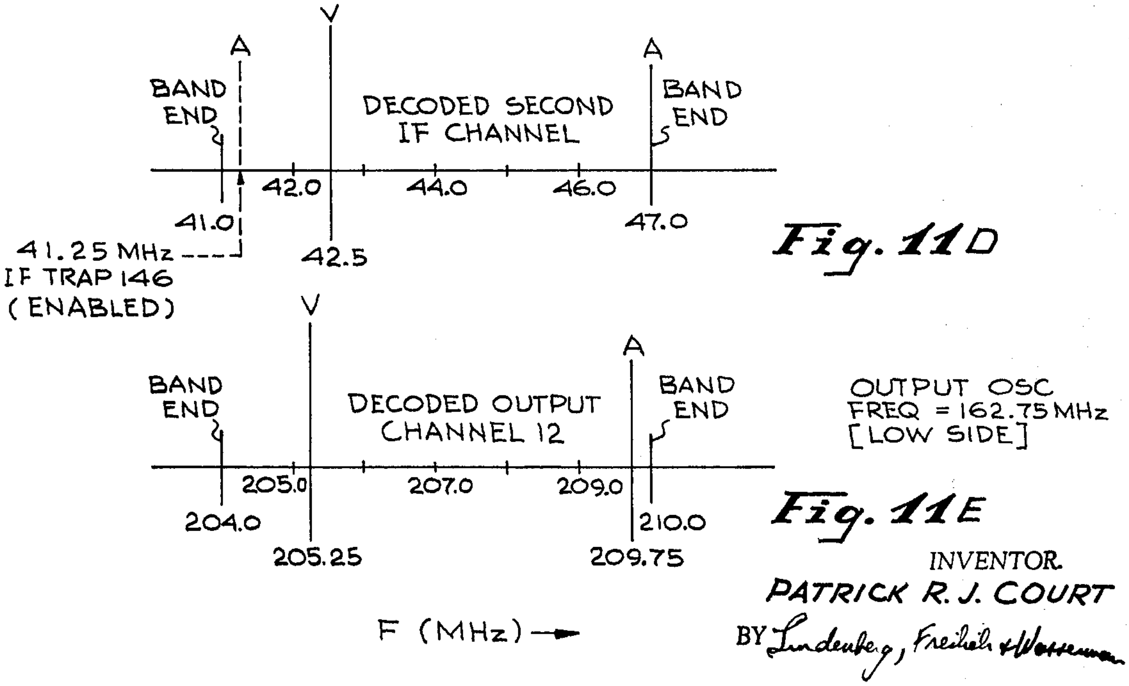

With both switching diodes disabled, the 41.25 MHz IF trap 146 is operative and the 5.75 MHz crystal oscillator 160 operates also to provide an input to the audio transposition mixer 150. As mixer 150 also has applied to it a 41.25 MHz input modulated with audio and 31.5 KHz and 15.750 KHz, it provides a 47.0 MHz output, also modulated with audio, 31.5 KHz and 15.750 KHz, which is passed to adder 128 through the tuned circuit 138. The 47.0 MHz signal represents the transposed audio carrier and this is combined with the second IF audio carrier at 41.25 MHz and the second IF video carrier at 42.5 MHz. The output of adder 128 therefore includes two audio carriers, one at 41.25 MHz and a second at 47.0 MHz. In the first and second decoding modulators 130 and 132 the sine and cosine encoding signals are cancelled on all three carriers by virtue of the 15.750 and 31.5 KHz signals received from the decoding signal processing circuit 144. As the trap 146 at the output of the second decoding modulator is now operative, it attenuates the 41.25 MHz audio carrier, leaving only the second IF video carrier at 42.5 MHz and the 47.0 MHz audio carrier as inputs to the output mixer 134. This situation is depicted in FIG. 11D.

It will be recalled that the output oscillator 148 is now operating at a frequency of 162.75 MHz, and so the output mixer 134 functions in a low side mode. The second IF video carrier is converted to 42.5 plus 162.75 MHz which is 205.25 MHz and the second IF audio carrier is converted to 47.0 plus 162.75 which is 209.75 MHz. These of course are the correct frequency assignments for channel 12, as illustrated in FIG. 11E. As the output mixer 134 operates in a low side mode there is no frequency inversion of the channel during this output conversion process. The output from mixer 134 is therefore in every way a standard channel, in that both the audio and the video have been fully decoded, and this is delivered to the subscriber's receiver.

By virtue of using the output oscillator as the dual mode oscillator, there is always a 41.25 MHz audio IF carrier present at the detector 142 regardless of whether or not the transmitted channel is encoded or non-encoded. The presence or absence of 15.750 and/or 31.50 KHz modulations on this carrier can therefore be used to positively identify which channels are encoded or non-encoded and therefore used to instruct the output oscillator 148 in which mode it should operate. By contrast, with the other arrangement as depicted in FIG. 5, in which the second oscillator has two modes of operation, the second IF audio carrier may be either at 41.25 MHz or at 47.0 KHz. It may or may not therefore be present at the detector 104 and so there is an ambiguity in determining the significance of the presence or absence of the 15.750 KHz and/or 31.5 KHz signals. In this arrangement therefore a manually operated second oscillator mode switch is preferable, as the subscriber can obviously determine whether or not the transmission is encoded simply by observing the picture on his television receiver.

From the foregoing description it is clear that the present invention accomplishes the encoding of the audio information in a CATV channel and allows the clean recovery in a decoder of the audio carrier and any other information which is modulated upon that carrier. It is also clear that the invention accomplishes all of the other previously stated objectives.

What is claimed is:

1. In a CATV system of a type wherein, in unencoded form a television channel has a video carrier at a predetermined frequency at a standard location within the channel which is separated in frequency from an audio carrier, also at a predetermined frequency at a standard location within the channel by a predetermined amount for intercarrier demodulation by subscriber receivers, a method of preventing audio from being intelligibly reproduced by an unauthorized subscriber receiver of the type using intercarrier demodulation for recovering the audio and for maintaining the audio recoverable by an authorized subscriber receiver, unaffected by adjacent CATV television channel signals comprising:

generating an audio carrier having said predetermined frequency, generating a video carrier having a frequency which differs from said predetermined video frequency and which is separated from the frequency of the audio carrier by a predetermined amount which prevents intercarrier demodulation by said unauthorized subscriber receivers, said video carrier being substantially 1.5 MHz below the high end of said television channel, modulating audio signals on said audio carrier, modulating video signals on said video carrier, and transmitting said audio and video modulated on their respective carriers to said receivers.

2. In a CATV system as recited in claim 1 wherein said audio carrier frequency is 0.25 MHz below the high end of the television channel and said video IF carrier frequency is 1.5 MHz below the high end of the television channel.

3. In a CATV system of a type wherein, in unencoded form a television IF channel has a video IF carrier at a predetermined frequency location which is separated in frequency from an audio IF carrier, also at a predetermined frequency location by a predetermined amount for intercarrier demodulation by subscriber receivers, a method of preventing audio from being intelligibly reproduced by an unauthorized subscriber receiver of the type using intercarrier demodulation for recovering the audio and for maintaining the audio recoverable by an authorized subscriber receiver, undisturbed by adjacent CATV television channel signals comprising:

generating an audio IF carrier at said predetermined frequency location within a television channel,
generating a video IF carrier at a frequency which is less than 4.5 MHz different from the audio carrier IF frequency within said television channel,
modulating audio signals on said audio IF carrier,
modulating video signals on said video IF carrier, and
transmitting said audio and video modulated on their respective IF carriers to said receivers.

4. In a CATV system as recited in claim 3, the method of recovering said audio comprising:

receiving said transmitted audio and video signals respectively modulated on audio and video carriers,
converting said received audio and video carriers to intermediate frequencies wherein the video IF carrier is at said predetermined frequency location within a television channel and the audio IF carrier is at a frequency lower than said video IF carrier and separated from said video IF carrier by the same frequency differences as existed between said received audio and video carriers,
transposing said audio IF carrier to a frequency which is separated 4.5 megacycles from the frequency of said video IF carrier, and
heterodyning said audio and video IF carriers with a signal having a frequency which enables reception and intelligible use by a television receiver.

5. In a CATV system as recited in claim 3, the method of recovering said audio comprising:

receiving said transmitted audio and video signals respectively modulated on audio and video carriers,
transposing said audio carrier to an intermediate frequency which is 0.25 MHz above the frequency of the low end of the IF channel, and
heterodyning both said audio and video IF carriers wth a signal having a frequency which transposes said video IF carrier to a predetermined frequency within a television channel and said audio IF carrier to a frequency 4.5 MHz above said video carrier frequency.

6. In a CATV system of the type wherein in unencoded form a television channel has an audio IF carrier at a predetermined frequency location and a video IF carrier at a predetermined frequency location 4.5 MHz higher than said audio IF carrier, means for preventing audio from being intelligibly reproduced by an unauthorized subscriber receiver and for enabling recovery of said audio by authorized subscriber receivers unmodulated by adjacent CATV television channel signals comprising:
a source of audio signals,
means for generating an audio IF carrier having said predetermined frequency,
means for modulating said audio IF carrier with said audio signals,
a source of video signals,
means for generating a video IF carrier having a frequency less than 4.5 MHz apart yet higher in frequency than the frequency of said audio IF carrier,
means for modulating said video IF carrier with said video signals, and
means for transmitting said audio modulated on an audio IF carrier and said video modulated on a video IF carrier to subscriber receivers.

7. In a CATV system as recited in claim 6 wherein the frequency of said video IF carrier is 1.25 MHz above the frequency of said audio IF carrier.

8. In a CATV system of the type having transmitter means for generating a carrier signal for a television channel having modulated thereon a video carrier and an audio carrier, the frequency of said video carrier being spaced less than 4.5 MHz distant from the frequency of said audio carrier, and said video carrier being displaced from its customary frequency location, a decoder comprising:

intermediate frequency means for removing the channel carrier while maintaining the IF carrier frequencies of said video carrier and audio carrier within said television channel without changing their relative frequency separation,
first oscillator means,
first means for heterodyning said audio IF carrier with the output of said first oscillator means for transposing said audio carrier IF frequency to a frequency spaced 4.5 MHz from that of said video IF carrier,
second oscillator means, and
second means for heterodyning said video IF carrier and said transposed audio IF carrier with the output of said second oscillator means for transposing them to frequencies which can be utilized by a television receiver.

9. Apparatus as recited in claim 8 wherein said intermediate frequency means includes means for converting said video carrier and said audio carrier to a first intermediate frequency channel wherein said first video IF carrier and first audio IF carrier are at relatively higher frequencies than said audio and video carrier frequencies, said relatively higher frequency being on the low frequency end of said IF channel, and means for converting said first audio IF carrier and said first video IF carrier respectively to a second audio IF carrier and a second video IF carrier which are lower in frequency than the first audio IF carrier and first video IF carrier and which are located near the higher frequency end of a second intermediate frequency television channel created by said last named means for converting.

10. In a CATV system of the type having transmitter means for generating a carrier signal for a television channel having modulated thereon a video carrier and an audio carrier, the frequency of said video carrier being spaced less than 4.5 MHz distant from the frequency of said audio carrier, and said video carrier being displaced from its customary frequency location, a decoder comprising:

intermediate frequency means for converting said video and audio carriers respectively to intermediate frequency carriers without changing their relative frequency separation, an adder circuit to which the output of said intermediate frequency means is applied, first oscillator means, a first means, to which the output of said intermediate frequency means is applied for selectively heterodyning the output of said first oscillator means with said audio IF carrier for transposing said audio IF carrier to a frequency spaced 4.5 MHz from that of said video IF carrier, means for applying the output of said first means for selectively heterodyning to said adder to be added to the output of said intermediate frequency means, a trap means connected to the output of said adder circuit for removing therefrom any audio IF carrier received from said intermediate frequency means, second oscillator means, and second means for heterodyning the outputs of said adder circuit with the output of said second oscillator means for transposing them to frequencies which can be utilized by a subscriber television receiver.

* * * * *